July 24, 1962 K. A. DOMEISEN 3,045,482
RETRACTION VOLUME GAGE
Filed Feb. 12, 1960 2 Sheets-Sheet 1

INVENTOR.
KARL A. DOMEISEN.
BY
ATTORNEYS.

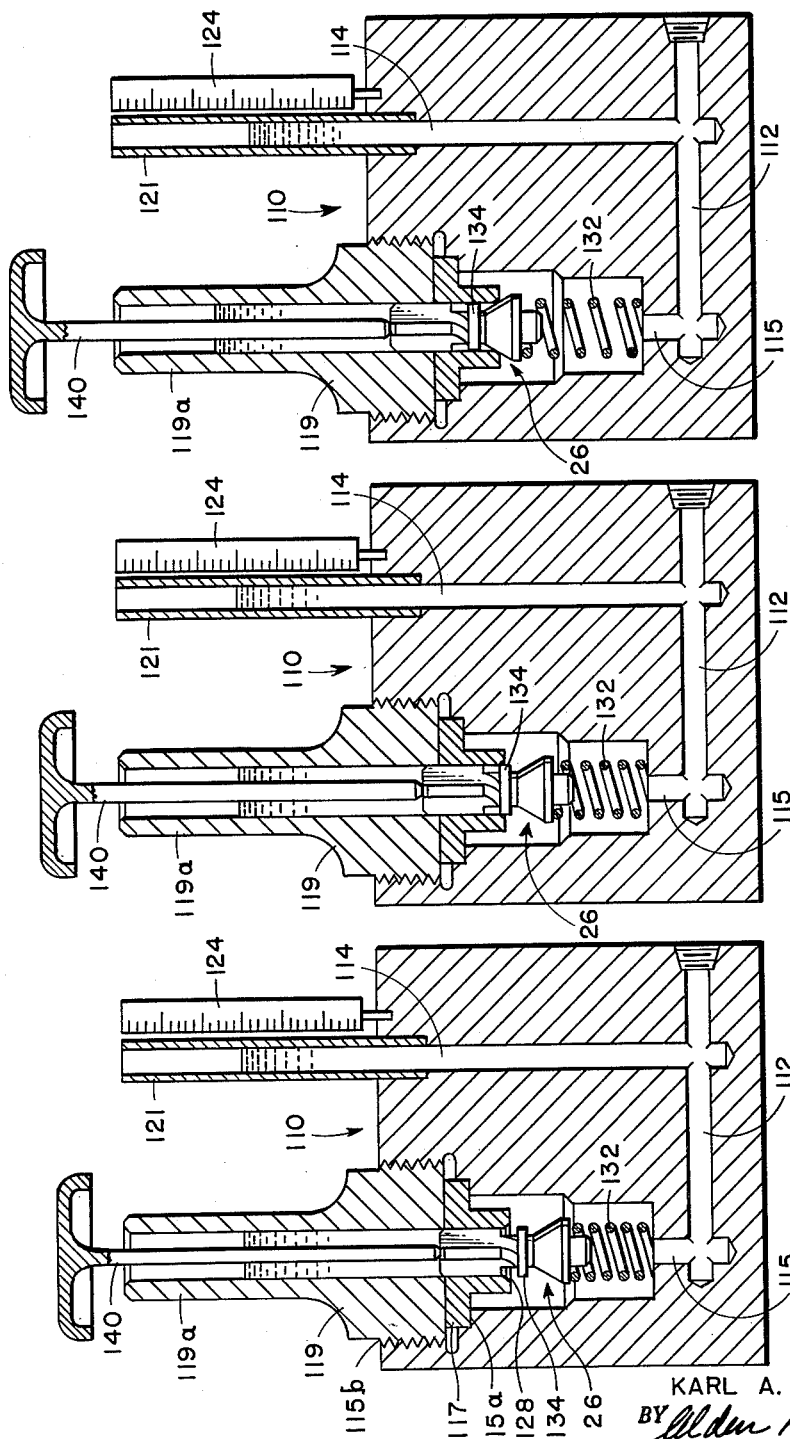

United States Patent Office 3,045,482
Patented July 24, 1962

3,045,482
RETRACTION VOLUME GAGE
Karl A. Domeisen, Marblehead, Mass., assignor to Avco Corporation, a corporation of Delaware
Filed Feb. 12, 1960, Ser. No. 8,353
1 Claim. (Cl. 73—149)

This invention relates to a retraction volume gage and relates to a measuring instrument comprising mechanism in combination with a manometer whereby it is possible to measure the retraction volume of delivery valve mechanisms.

The invention is particularly useful in connection with delivery valves for diesel engine fuel injection pumps in which delivery is controlled by an intake port and a spill hole. When connected with a high pressure side of the pump cylinder this spill hole determines the end of compression, and therefore the amount of fuel delivered. Since the pressure of the overflow chamber with which the spill hole is connected is considerably lower than the pressure in the cylinder, a backflow of highly compressed fuel would normally take place after the connection between the cylinder and the overflow chamber is cleared. In order to prevent this, a "delivery valve" is installed in the pump immediately after the cylinder. The purpose of this valve is twofold:

(1) It prevents complete unloading of the high pressure in the injection line leading from the pump to the nozzle;
(2) It increases the volume of the injection line. This increase, called "retraction volume," is necessary to reduce the fuel pressure after delivery has ceased, thereby taking care of line retraction and avoiding after dripping of the nozzle.

In practice, as well as in experimental work related to fuel injection employing a pump with a delivery valve, it is often important to know the retraction volume which a given delivery valve will produce. For instance, if a delivery valve is to be replaced in a pump to give a different retraction volume, it is quite important that a means be available to determine the relation retraction volume available between the formerly used delivery valve and the one which is to be substituted therefor. It is also important that in some instances the specific value of the retraction volume be established. This, in some cases, could be arrived at by a computation of the volume of the moving parts of the delivery valve but a more satisfactory and easily workable procedure is by a direct measurement.

In order to accomplish the purpose of measuring the retraction volume of the delivery valve by this invention, the valve itself is mounted so that it forms a part of a manometer and forces the liquid in the manometer to one position when the valve is closed and to another position when the valve is retracted, thus measuring the retraction volume as a measurement of the height of the liquid in the manometer.

The objects of the invention will be further evident on consideration of the following description and by reference to the accompanying drawings forming a part hereof and wherein:

FIG. 2 is a cross section through the assembled manometer with the delivery valve positioned as an actuating part of the manometer unit. In this figure the delivery valve is shown in position it would occupy when fuel is delivered by the pump.

FIG. 3 is a section similar to FIG. 2, but shows the delivery valve in position just closed where the subsequent movement of the valve will start the effective movement for the retraction volume.

FIG. 4 is a view similar to FIGS. 2 and 3, but shows the delivery valve in its closed position with the actuation for retraction volume completed.

Figure 1:
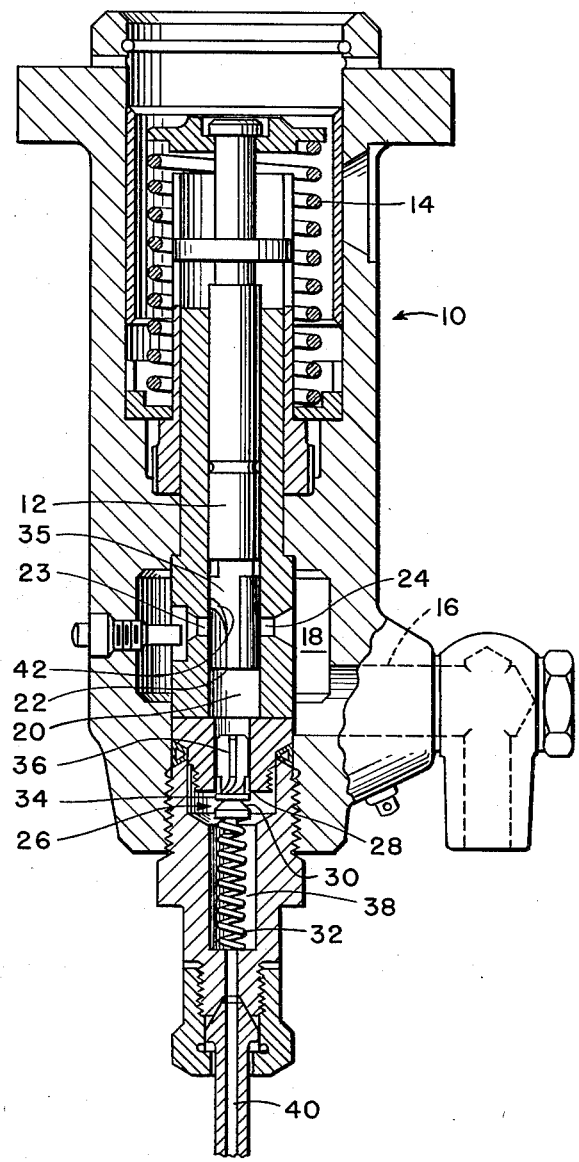
FIG. 1 is a cross section of a fuel injection pump with a delivery valve associated therewith. This is an illustration of the mechanism concerned and particularly the delivery valve and its parts and illustrates the cooperative action between the delivery valve and the pump, the pump being shown inverted from conventional position to show the delivery valve in relation to other figures herein.

Referring to the drawings, FIG. 1 shows a fuel injection pump 10 having a reciprocable plunger 12 moved by a tappet and cam (not shown) against a spring 14. The spring 14 returns with the plunger 12 in its opposite direction of movement. Fuel is supplied through inlet 16 to annular chamber 18 and this fuel flows into chamber 20 when the surface 22 of the plunger 12 is below the openings 24 and 23. The chamber 20 thus filled with fuel at the maximum position of the plunger 12 and on the movement of the plunger 12 to compress the fuel in the chamber 20, the passage or so-called "spill hole" is cut off and the fuel in the chamber 20 is compressed by the plunger. The pressure exerted on the fuel in the chamber 20 causes the delivery valve 26 to move off its seat 28, the delivery valve conical portion 30 having contacted the seat for closing of the valve on the action of spring 32. When the delivery valve has moved a sufficient distance to cause the cylindrical collar 34 to move past the seat 28, fuel from the chamber 20 will flow through the recessed portion 36 into the chamber 38 and out through the fuel line 40 to the injection nozzle (not shown) and into the cylinder of the engine to which fuel is being supplied. Thus, the fuel will continue to flow until the helical portion 42 on the plunger 12 comes in contact with the opening 23 at which time there is set up a connection between the opening 24 and the longitudinal slot 35 of the plunger so that the pressure in chamber 20 is released. This causes the delivery valve 26 to be pushed closed by the action of the spring 32 and the flow of the fuel is thus stopped. As the delivery valve moves further to a closed position and from the displacement resulting between contact of the collar 34 with seat 28 and the seating of conical portion 30, there will result what is known as a "retraction" causing a retraction of the fuel column in the chamber 38 and the line 40. The displacement is called a "retraction volume" and causes a reduction in the pressure in the line 40 so that it will minimize the possibility of fuel dripping from the end of the nozzle. It is necessary to design the delivery valve so that there is a sufficient amount of retraction volume to satisfactorily reduce the pressure in the line and it is important that the retraction volume be accurately maintained. Any given valve has a retraction volume of definite amount which will give certain results. In practice it is often important when replacing a delivery valve or when a delivery valve of this retraction volume value is to be used to know what the actual retraction volume which is accomplished by this valve may be. Therefore, the measurement of the retraction volume of any given valve is an important procedure. Computation of the volume by actual measurement of the parts would be possible but a less complicated and more practicable method is desirable.

Considering the requirements, the following described mechanism has been prepared:

Referring to the drawings, FIG. 2, a block 110 preferably of transparent material, such as Lucite, is drilled with connecting passages, a horizontal passage 112, a vertical passage 114 and a second and parallel vertical passage 115. The passage 115 is further provided with an enlarged drilled vertical region 115a and a threaded connecting opening 115b. The opening 115a is so formed as to receive a delivery valve assembly 26 which is held in place by a Lucite retainer plug 119, threaded at its lower end and extending upwardly in a cylindrical hollow tube portion 119a. The vertical drilled opening 114 has a vertical transparent or leg tube 121 inserted therein which extends upwardly parallel to the upper cylindrical tube or leg portion 119a of the retainer plug. The tube or leg portions 119a and 121 together with the connecting passages 115a and 115 and the connecting drilled horizontal passage 112 form a U-tube manometer with parallel upstanding legs. A scale 124, marked in millimeters, is placed adjacent the upwardly extending tube 121. The cross section of the tube 121 is preferably one square millimeter in area and therefore as liquid is placed in the U-tube manometer, a reading of one millimeter on the scale 124 will be equivalent to a change in volume in the tube 121 of one cubic millimeter.

The delivery valve 26 is made up of cylindrical portion 117 which fits in the drilled cylindrical opening 115a. The valve 26 is urged upward by a spring 132 so that when the delivery valve is in the condition shown in FIG. 3, the collar 134 closes the opening at 128 and there is therefore no connection between the cylindrical tube manometer leg portion 119a and the portion of the manometer made up by the passage 112, 114 and tube 121. However, the rod 140 extending downwardly through the cylindrical tube member 119a may be actuated by downward pressure to manually move the delivery valve to the position shown in FIG. 2. When this occurs, there is provided a connection between the tube portion 119a and the passage 112 and tube 121 and with the liquid present in the manometer, the liquid in both legs of the manometer will seek its level and the level of the liquid in both tubes 119a and 121 will be equal. Reading can then be taken on the scale 124 with the valve in the position shown in FIG. 2. The rod 140 is then released and the action of the spring 132 will force the delivery valve 26 first to the position shown in FIG. 3 where the passage 115a is just closing and subsequent movement to the position of FIG. 4 will cause a displacement of the liquid in the tube 121 and the difference in reading on the scale 124 read in millimeters will be the displacement volume of the delivery valve in cubic millimeters inasmuch as the cross sectional area of the tube 121 is one square millimeter.

The invention has been described by reference to a specific structure found practical in actual operation, but modifications are intended within the scope of the following claim.

I claim:

In an instrument for measuring retraction volume of a delivery valve assembly of the type having a movable valve member thereof carried for reciprocating movement in a longitudinally extending opening in said assembly and reciprocable in said opening from an open delivery position passing liquid therethrough and having means urging said valve from said open delivery position to a closed retracted position affording retraction volume determined by longitudinal movement of said valve member after closing of said movable valve member into said opening, comprising: a liquid containing U-tube manometer having two upstanding legs, a scale adjacent at least one of said legs for measurement of relative height of liquid in said legs, one of said legs having a lower portion thereof formed to receive said valve assembly, an upper section of said leg formed with a retaining portion to hold said assembly with said longitudinally extending opening forming a liquid carrying communication between said manometer leg portions, said lower manometer leg portion formed with means to hold said valve assembly with said movable valve member carried for reciprocation in said assembly in said longitudinally extending opening, said means comprising a spring below said valve member normally urging said valve member upwardly into said assembly from the open position toward its said closed retracted position thereby urging said movable valve member into said opening and actuating said valve member in its said retraction volume movement, a manually actuable member extending downwardly through the said upper portion of said manometer leg for moving said movable valve member into open position thereby to deliver liquid through said valve member to cause said liquid in said manometer legs to seek a common level and on manual release of said actuating member, said spring actuates said valve member in upward direction causing said movable valve member to move in said longitudinal opening to its retracted closed position and thereby indicating said retraction volume as a function of difference in height of liquid in the legs of said manometer.

References Cited in the file of this patent
UNITED STATES PATENTS

| | | |
|---|---|---|
| 2,011,928 | Cossor | Aug. 20, 1935 |
| 2,744,407 | Kruger et al. | May 8, 1956 |
| 2,747,400 | Fatio | May 29, 1956 |